(12) United States Patent
Knappmann et al.

(10) Patent No.: US 8,213,278 B2
(45) Date of Patent: Jul. 3, 2012

(54) SYSTEM COMPRISING AN OPTICAL DISC AND AN APPARATUS FOR READING OF RESPECTIVE DATA

(75) Inventors: Stephan Knappmann, Zimmern OB Rottwell (DE); Michael Krause, Ulm (DE); Stefan Kimmelmann, Pfaffenweiler (DE)

(73) Assignee: Thomson Licensing, Boulogne (FR)

( * ) Notice: Subject to any disclaimer, the term of this patent is extended or adjusted under 35 U.S.C. 154(b) by 0 days.

(21) Appl. No.: 12/998,979

(22) PCT Filed: Dec. 11, 2009

(86) PCT No.: PCT/EP2009/066887
§ 371 (c)(1),
(2), (4) Date: Jun. 21, 2011

(87) PCT Pub. No.: WO2010/072583
PCT Pub. Date: Jul. 1, 2010

(65) Prior Publication Data
US 2011/0255385 A1    Oct. 20, 2011

(30) Foreign Application Priority Data

Dec. 22, 2008    (EP) .................................... 080305998

(51) Int. Cl.
*G11B 7/00*    (2006.01)
(52) U.S. Cl. .................... 369/44.37; 369/44.41
(58) Field of Classification Search .......... None
See application file for complete search history.

(56) References Cited

U.S. PATENT DOCUMENTS
2009/0303850 A1   12/2009   Nakai et al.

FOREIGN PATENT DOCUMENTS

| WO | WO2005088631 | 9/2005 |
|---|---|---|
| WO | WO2006038154 | 4/2006 |
| WO | WO2006129209 | 12/2006 |
| WO | WO2006129213 | 12/2006 |
| WO | WO2007020580 | 2/2007 |
| WO | WO2008012985 | 1/2008 |

OTHER PUBLICATIONS

Kurihara et al., "Capacity Increase in Radial Direction of Super-Resolution Near-Field Structure Read-Only-Memory Disc", Japanese Journal of Applied Physics, Part 1, vol. 46, No. 6B, Jun. 22, 2007, pp. 3898-3901.
Search Report Dated Apr. 13, 2010.

*Primary Examiner* — Paul Huber
(74) *Attorney, Agent, or Firm* — Robert D. Shedd; Patricia A. Verlangieri

(57) ABSTRACT

The optical disc comprises a substrate layer and a data layer disposed on the substrate layer, the data layer having a mark/space data structure arranged in tracks which are arranged in groups being separated each by a land section. The tracks of the groups are each arranged as a spiral, and the start of a track of a consecutive group begins at a position corresponding with the end of a track of a preceding group. A group comprises advantageously an inner track, a center track and an outer track. The optical disc comprises in a preferred embodiment a nonlinear layer with a super-resolution structure and the track pitch between neighboring tracks within a group is below the diffraction limit of a corresponding pickup for reading of data. Further, a tracking method is described which does not rely on tracking offsets to detect the inner and outer tracks of a group.

12 Claims, 4 Drawing Sheets

| | Pit | land | Pit | land | Pit | land | Pit | Average track page |
|---|---|---|---|---|---|---|---|---|
| 1 | 70nm | 70nm | 70nm | 70nm | 70nm | 210nm | 70nm | 560nm /3 = 187nm |
| | pit to pit track pitch = 140nm | | | | | | | |
| | group to group track pitch = 560nm | | | | | | | |
| 2 | 80nm | 80nm | 80nm | 80nm | 80nm | 240nm | 80nm | 640nm /3 = 213nm |
| | pit to pit track pitch = 160nm | | | | | | | |
| | group to group track pitch = 640nm | | | | | | | |
| 3 | 90nm | 90nm | 90nm | 90nm | 90nm | 270nm | 90nm | 720nm /3 = 240nm |
| | pit to pit track pitch = 180nm | | | | | | | |
| | group to group track pitch = 720nm | | | | | | | |

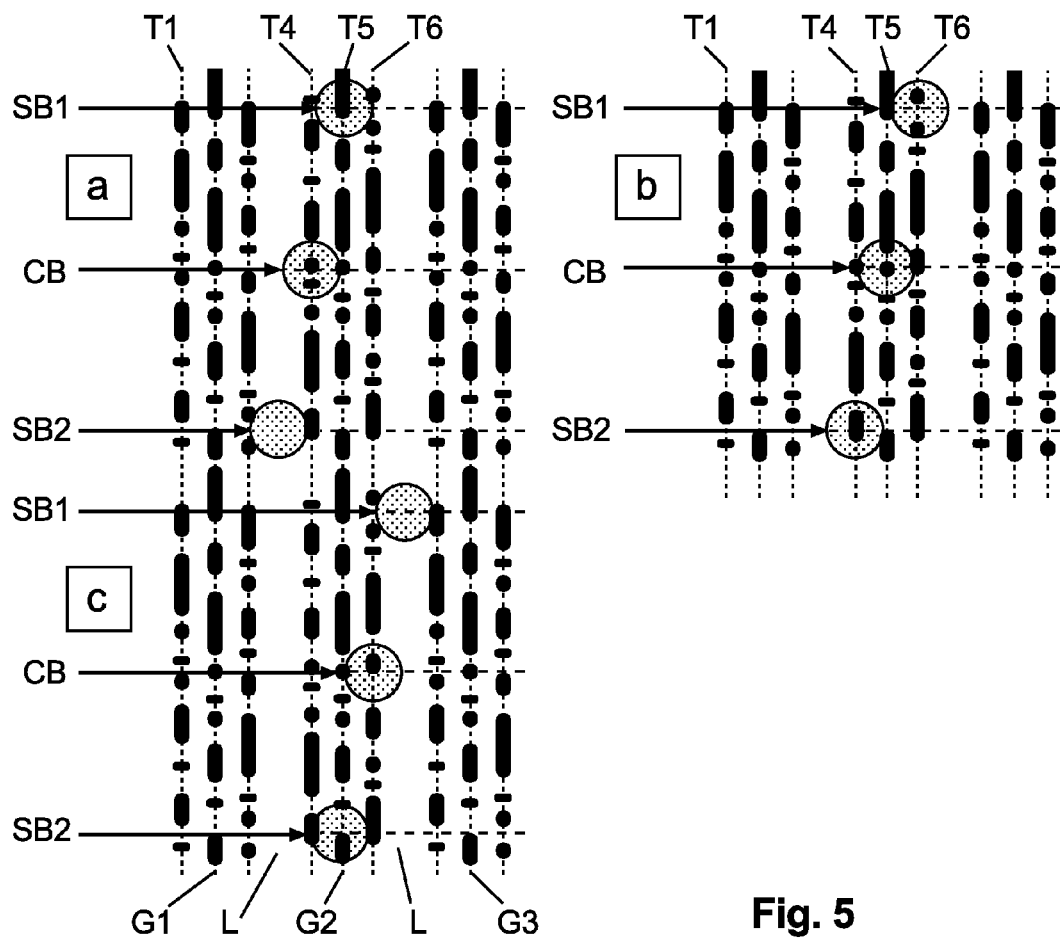
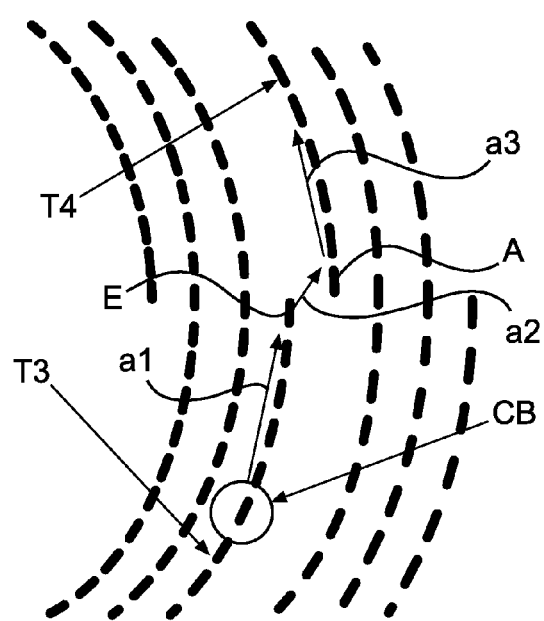
Fig. 5
Fig. 6 ically readable manner, for example by means of a laser and an optical detector, being integrated within a pickup. The detector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

SYSTEM COMPRISING AN OPTICAL DISC AND AN APPARATUS FOR READING OF RESPECTIVE DATA

This application claims the benefit, under 35 U.S.C. §365 of International Application PCT/EP2009/066887, filed Dec. 11, 2009, which was published in accordance with PCT Article 21(2) on Jul. 1, 2010 in English and which claims the benefit of European patent application No. 08305998.0, filed Dec. 22, 2008.

TECHNICAL FIELD OF THE INVENTION

The present invention relates to system comprising an optical disc with a substrate layer and a data layer disposed on the substrate layer, the data layer having a mark/space data structure arranged in tracks being arranged in groups, and an apparatus for reading data on the optical disc.

BACKGROUND OF THE INVENTION

Optical storage media are media in which data are stored in an optically readable manner, for example by means of a laser and an optical detector, being integrated within a pickup. The detector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual layer disc. For reading and writing of a Blu-Ray disc an optical pickup with a laser wavelength of 405 nm and a numerical aperture of 0.85 is used. On the Blu-Ray disc a track pitch of 320 nm and a mark length from 2T to 8T and 9T is used, where T is the channel bit length, and which corresponds with a minimum mark length of 138-160 nm.

New optical storage media with a super resolution near-field structure (Super-RENS) offer the possibility to increase the data density of the optical storage medium by a factor of two to four in one dimension as compared with the Blu-Ray disc. This is possible by a so-called Super-RENS structure, which is placed above a data layer of the optical storage medium, and which significantly reduces the effective size of a light spot used for reading from or writing to the optical storage medium. The super resolution layer is a nonlinear layer, which is also called a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, the reflectivity being dependent on the pit structure of a corresponding data layer. Therefore, the Super-RENS effect allows to record and read data stored in marks of an optical disc, which have a size below the resolution limit of a corresponding optical pickup. Super-RENS storage media comprising a super resolution near-field structure formed of a metal oxide are known from US 2004/0257968 and WO 2005/081242.

In "Capacity Increase in Radial Direction of Super-Resolution Near-Field Structure Read-Only Memory Disc", Kurihara et al., Jpn. J. Appl. Phys., Vol. 46, No. 6B (2007), pp. 3898-3901, a Super-RENS disc is described, which uses a group tracking technique to reduce the track pitch between neighboring tracks below the optical resolution limit of a corresponding pickup. Experimental results are presented, which show that for tracks arranged in groups of three single tracks on the disc, an acceptable carrier-to-noise ratio for pits with a pit length of 100 nm and a track pitch of 200 nm can be obtained, by using a conventional HD-DVD pickup. A group of tracks is recognized as a single track by the far-field optics of the pickup and a conventional push-pull method could be used for tracking, which uses in addition an offset adjustment for tracking of a respective track within a group. It was experimentally verified that with a group comprising three tracks, the data capacity could be increased by 1.5-fold greater than that of compared to a conventional Super-RENS ROM-disc.

IN WO 2004/032123 a group track structure is applied to a magneto-optical read-only storage medium for providing a track pitch below the diffraction limit of a respective focusing optics. A data track within a group is selected by providing an offset value to a tracking regulation.

BRIEF SUMMARY OF THE INVENTION

The system comprises an optical disc and an apparatus for reading data on the optical disc, the optical disc including a substrate layer, a data layer having a mark space data structure with data arranged in tracks on the substrate layer and a non-linear layer with a super-resolution structure disposed on the data layer. The tracks are arranged in groups separated by a land section and the tracks of a group are arranged as a spiral. The beginning of a track of a neighboring group begins at a position at the end of a track of a preceding group.

A group comprises in particular at least an inner track, a center track and an outer track and the end of the outer track is located at a radial and angular position close to the beginning of an inner track of a consecutive group, so that a pickup of an apparatus for reading of data on the optical disc can shift easily from a specific group to the consecutive group when reading data. The end of the outer track may be bent in addition into the direction of the beginning of the inner track of the consecutive group, and the beginning of an inner track of a group may be bent into the direction of the end of an outer track of a preceding group so that a transition from one group to the next group can be performed by the pickup without any disruptive movement in radial direction.

The apparatus for reading data on the optical disc comprises a pickup with a laser, a detector unit and an objective lens, the pickup generating a main beam for reading of data and generating two satellite beams for providing tracking information. The three beams are focused by the objective lens onto the optical disc and the reflected light from the disc is guided onto the detector unit within the pickup. The detector unit comprises a center detector and two satellite detectors to provide individual tracking signals for the inner track, the center track and the outer track of each group. In a preferred embodiment, for tracking on the inner track and the outer track of a group only the signals from the satellite detectors are utilized and for tracking on the center track only the signals from the center detector are utilized. The two satellite beams are operated preferably with less light intensity as compared with the main beam, to provide a super-resolution effect only for the main beam.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 2:
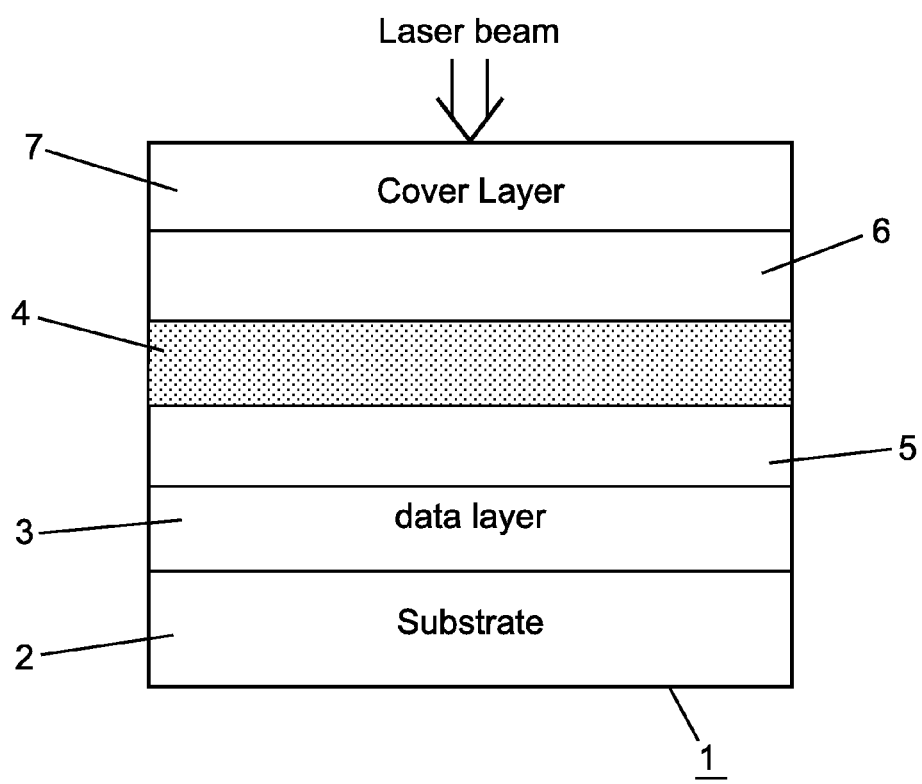

In FIG. 2 an optical storage medium 1 is shown in a cross section in a simplified manner, in particular a read-only (ROM) optical storage disc. On a substrate 2 a data layer 3 is arranged comprising a reflective metallic layer, for example an aluminum layer, the data layer 3 having a data structure consisting of marks and spaces arranged on essentially parallel tracks. In the case of a ROM disc, the marks and spaces consist of pits and lands, the pits being molded or embossed on the surface of substrate 2 representing the data layer 3. On the data layer 3 a first dielectric layer 5 is arranged and on the dielectric layer 5 a nonlinear layer 4 having a super-resolution near-field structure (Super-RENS) is arranged for providing the function of a mask layer for utilizing a super-resolution effect. The optical storage medium 1 is in particular an optical disc having a size similar to DVDs and CDs.

Above the nonlinear layer 4 a second dielectric layer 6 is disposed. As a further layer, a cover layer 7 is disposed on the second dielectric layer 5 as a protective layer. For reading the data of the data layer 3, a laser beam is applied from the top of the storage medium 1, penetrating first the cover layer 7. The first and second dielectric layers 5, 6 comprise for example the material $ZnS$—$SiO_2$. The substrate 2 and the cover layer 7 may consist of a plastic material, as known from DVDs and CDs. In other embodiments, the reflective metallic layer may be omitted, when a super-resolution near field structure is used, which does not provide an increase in transmittance due to a heating effect, but works with another Super-RENS effect, for example utilizes an effect providing an increased reflectivity of the nonlinear layer 4 when irradiated with a laser beam. The layers of the storage medium 1 are arranged in particular as a layer stack.

With the Super-RENS effect, the resolution of an optical pickup can be increased in track direction by a considerable amount, for example by a factor of two to four. This allows a reduction of the size of the marks and spaces of the tracks on the optical disc in track direction. But the Super-RENS effect as such does not allow to reduce the track pitch below the optical resolution limit of a corresponding pickup for reading of the data. If a push-pull effect is used for the tracking regulation of the pickup, the reduction of the track pitch is limited by the fact that the first order refracted beams have to be collected by the objective lens of the pickup. Otherwise there is no push-pull signal, because this signal is generated by the interference of the $0^{th}$ order and the $1^{st}$ order beams as reflected from the optical storage medium. For a Blu-Ray pickup this occurs at a track pitch of about 280 nm. The standard track pitch of a Blu-Ray disc is 320 nm.

Figures 3, 4:
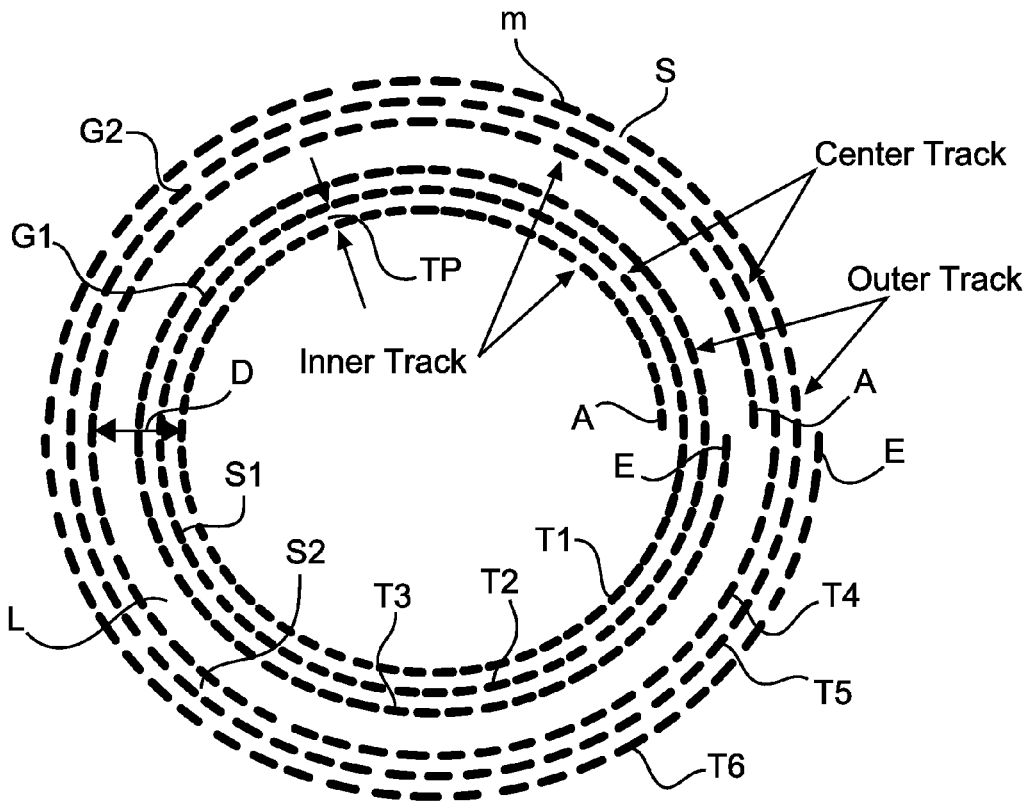

To overcome this problem, the optical disc as shown in FIG. 2 comprises a track structure, in which tracks are arranged in groups being each separated by a land section as shown in FIG. 3. The tracks of each group are arranged as a spiral, and the start of a track of a consecutive group begins at a circumferential position corresponding with the end of a track of a preceding group.

As shown in FIG. 3, a first group G1 contains three tracks T1-T3 being arranged as one spiral S1 having a beginning A and an end E. The track T1 represents an inner track, track T2 a center track and track T3 an outer track of the group G1. The next group G2 is separated by a land section L from the first group G1 and consists of an inner track T4, a center track T5 and an outer track T6, which are arranged as a second spiral S2. Further groups are also arranged on the optical disc in the same manner but are not shown due to simplification. Each track consists of marks m and spaces s, or of pits and lands in case of a read-only (ROM) disc.

The track pitch TP between two neighboring tracks within a group is the same for all tracks of a group. The distance between an outer track of a group and the inner track of the subsequent group is advantageously 2TP, so that the land section L can be understood as an empty track containing no data and having an angular circumference of 360°. This corresponds with a group to group track pitch D of 4TP between two neighboring groups. The beginning A of the spiral S2 is therefore located at a circumferential and radial position close to the end of group G1. Due to the land section L, the beginning A is shifted in radial direction away from the center of the disc by a distance equal to the track pitch TP. The circumferential position of the beginning A is located after the end E of spiral S1, so that a laser beam provided by a pickup can be easily shifted from the end E of track T3 to the beginning A of track T4 when reading the data of the optical disc.

In FIG. 4 a table is shown for illustrating three embodiments of a ROM disc with track structures as shown in FIG. 3. For the first embodiment, the pit to pit track pitch between two neighboring tracks within a group is TP=140 nm, and the width of the pits of each track is 70 nm. The pits of neighboring tracks are separated by a land area having a width of 70 nm. The next group is separated by a land section having a width of 210 nm, which leads to a group to group track pitch of 560 nm. The tracks of the second group are dimensioned in accordance with the preceding group. The average track pitch for the tracks as arranged on the disc is therefore 187 nm for this embodiment.

For the second embodiment, the pit to pit track pitch TP is 160 nm and the group to group track pitch is 640 nm. The width of the pits of each track is 80 nm and pits of neighboring tracks within a group are separated by land areas of 80 nm. The subsequent neighboring group is separated by the preceding group by a land section of 240 nm. The resulting effective track pitch for the tracks arranged on the optical disc is therefore 213 nm.

For the third embodiment, the pit to pit track pitch is 180 nm between neighboring tracks within a group, and the width of the pits is 90 nm. The land area between pits of neighboring tracks within a group has 90 nm width and the land section between neighboring groups 270 nm, which leads to a group-to-group track pitch of 720 nm.

A stamper for producing a ROM disc as shown with regard to FIGS. 2 and 3 can be mastered by using the following subsequent steps: mastering three consecutive tracks with data by including a constant radial feed equivalent to the track pitch TP between two neighboring tracks of group G1 for providing a spiral S1 as shown in FIG. 3. Then, the mastering beam is turned off for one track corresponding with a circumference of 360° by using the same constant radial feed as for spiral S1. In the next step, three tracks of the subsequent group G2 are mastered in the same manner to provide a further spiral S2 as shown in FIG. 3. Further groups of tracks are arranged and mastered accordingly. For the mastering, a laser beam or an electron beam may be used.

The width of the pits can be adjusted as shown in the table of FIG. 4. The pits need a sufficient width to generate sufficiently large amplitudes for the HF-signal and for a push-pull tracking signal. This limits the reduction of the track pitch TP. The smallest track pitch TP useful in combination with a Blu-Ray pickup could be about 160 nm, corresponding with the second embodiment shown in the table, which is below the diffraction limit of the pickup. Between pits of neighboring tracks in addition a sufficiently large land area is required as indicated in the table, to reduce cross-talk from neighboring tracks.

An apparatus for reading of data of an optical disc in accordance with FIGS. 2 and 3 includes a three beam optical pickup providing a center beam for reading of the data and for providing a focus signal and two satellite beams for providing tracking signals. For the satellite beams, a lower laser power can be selected with regard to the laser power of the center beam because no super-resolution effect is necessary for generating tracking signals. The super-resolution effect is only required for the smallest pits having a size being below the diffraction limit. The larger pits are generating tracking signals with sufficient amplitude.

Therefore, a conventional differential push-pull grating can be used within the pickup to generate the three beams. The satellite beams have a lower power than the center beam. The radial distances between the light spots of each of the two satellite beams and the center beam on the disc are equal to the track pitch TP.

The tracking of such a pickup is now explained with regard to FIGS. 5 an 6 for an optical disc in accordance with FIGS. 2 and 3. As shown in FIG. 5a, the light spot of the center beam CB is adjusted to the inner track T4 of group G2, of the satellite beam SB1 to the center track T5 and of the satellite beam SB2 to the land section L between group G1 and group G2. The radial feed of the pickup is equal to TP for one revolution, when reading the data of track T4.

After reading the data of track T4, the center beam CB continues to read the data of the center track T5 as shown in FIG. 5b. The satellite beam SB1 is then adjusted to the outer track T6 and satellite beam SB2 to the inner track T4. After reading the data of track T5, the center beam CB continues to read the data of track T6, as shown in FIG. 5c. The satellite beam SB1 then moves along the land section L between groups G2, G3 and the satellite beam SB2 moves along the center track T5. At the end E of the track T3, shown in FIG. 6, a radial track jump is required for the center beam CB, respectively the pickup, to continue with reading of the data of the next track T4. The track jump is indicated by arrows a1, a2, a3 in FIG. 6. In addition, the polarity of the push-pull signal has to be inverted at the end of track T3 to force the center beam CB to follow the data path of the track T4. After one rotation, i.e. 360°, the tracking servo switches to the center push-pull signal and after another rotation the tracking servo switches back to the outer differential push-pull with inverted polarity compared to track 4. After each group, a radial jump of the pickup towards higher radius has to be performed. To accomplish this, the push-pull polarity has to be inverted correspondingly. Without changing the polarity the center beam CB would be pushed back to the same track again.

Figure 7:
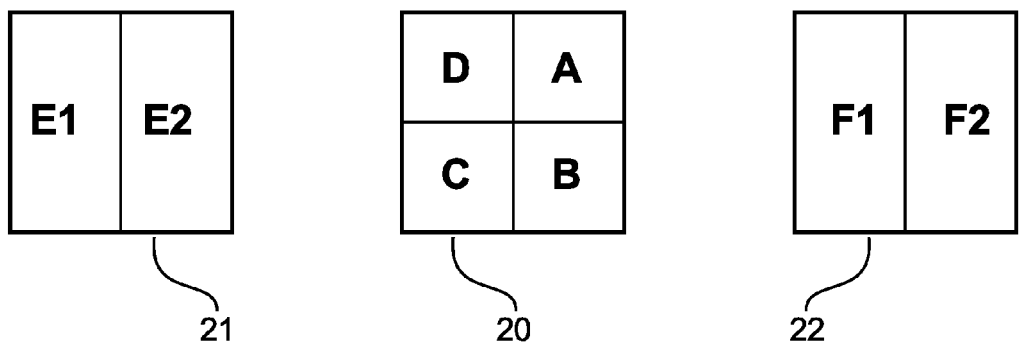

A detector unit, which can be used advantageously for the three beam tracking method for providing a push-pull tracking signal, as well as for providing a data signal and a focus error signal, is shown in FIG. 7. The detector unit comprises a quadrant detector 20 with four segments A, B, C, D for detecting light from the center beam CB as reflected from the optical storage medium. For the satellite beam SB1 a second detector 21 is provided and for the satellite beam SB2 a third detector 22, which are each split into two halves with regard to the radial direction of the optical storage medium. Detector 21 is split into two equal segments E1, E2 and detector 22 into two equal segments F1, F2 and the geometrical arrangement of the detectors 20-22 inside the pickup is made such that the reflected light from the main beam is centered on detector 20, reflected light from satellite beam SB1 centered on detector 21 and reflected light from the satellite beam SB2 centered on detector 22, when the main beam is located exactly on a data track.

The segments A-F2 are photosensitive elements as known from prior art. They provide corresponding electrical signals a, b, c, d, e1, e2, f1, f2, from which the tracking signal, the HF data signal and the focus signal can be calculated. When the center beam CB moves along an inner track of a group, a tracking signal TE1 for correcting the tracking error can be calculated as follows:

$$TE1 = (e2-e1) - (f2-f1)$$

When the center beam CB moves along a center track of a group, a tracking signal TE2 can be calculated as follows:

$$TE2 = (a+b) - (c+d)$$

When the center beam moves along the outer track of a group, a tracking signal TE3 can be calculated as follows:

$$TE3 = (f2-f1) - (e2-e1)$$

For the tracking signal TE1, correspondingly also for TE3, the difference signals e2−e1 and f2−f1 have to be subtracted, because detectors 21, 22 provide signals of different polarity dependent on whether the satellite beams SB1 and SB2 are located on a track or on a land section. The four segments A-D are used in addition to provide the HF data signal and the focus error signal for focus regulation. When the segments E1, E2, F1, F2 have the same size and same efficiency and the light intensity is the same for both satellite beams SB1, SB2, no correction factors are required for calculating the tracking signals TE1, TE3. Correspondingly, also no correction factors are required for calculating the tracking signal TE2.

The tracking signal TE2 for the center beam is just a conventional center push-pull signal. For comparison, a conventional differential push-pull signal TE is generated by the following formula:

$$TE = \{(a+b)-(c+d)\} - \beta\{(e2-e1)+(f2-f1)\}$$

Figure 8:
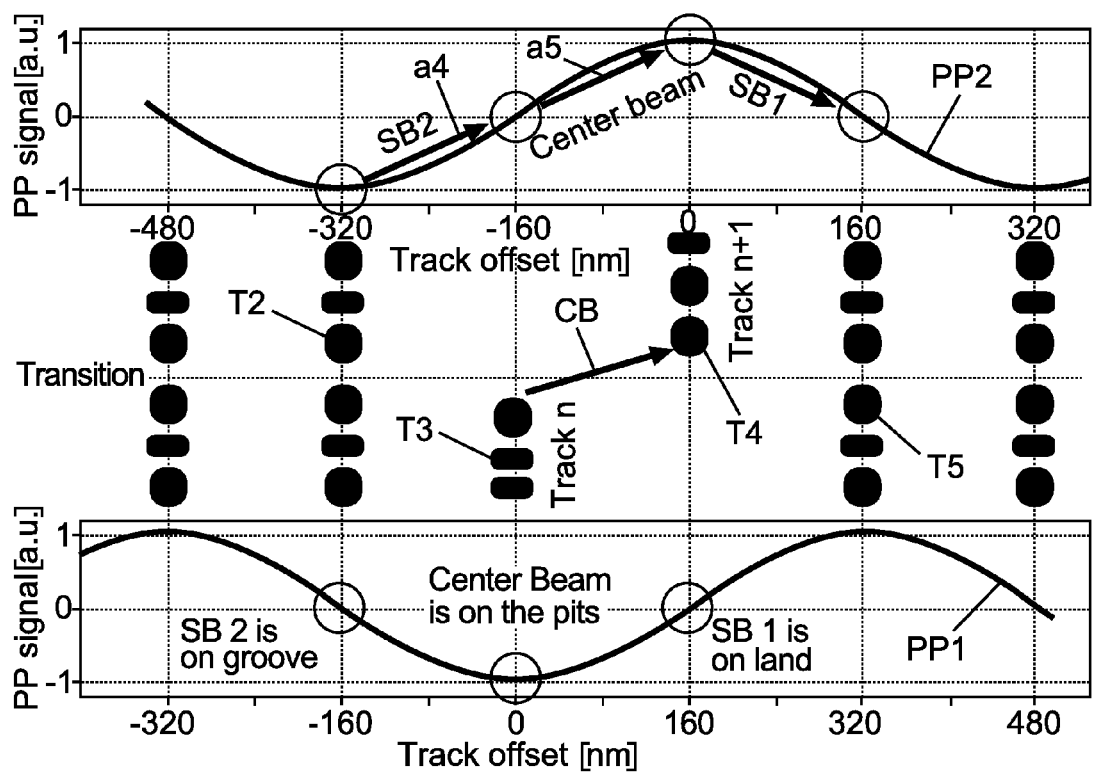

The switching of the polarity of the tracking signal, when shifting from one group to the next group, for example when shifting from track T3 to track T4 as explained with regard to FIGS. 3, 5, is sufficient for the center beam to follow the correct path, as can be demonstrated with regard to FIG. 8. FIG. 8 shows that the center beam CB moves from track T3 to track T4, as indicated by the arrows. The push-pull signal PP1 is the tracking signal when the center beam CB is moving along the track T3, or more generally the push-pull signal of the group of tracks before the transition. When the center beam CB is centered on track T3, the satellite beam SB2 is located on the track T2 and satellite beam SB1 on a land section and the push-pull signals of each of the detectors 21, 22 are zero.

The satellite beam SB1 moves ahead of the center beam CB and when the center beam CB has reached the end of track T3, the satellite beam SB1 is located already on track T4. This provides a track offset of −0.25 TP because the push-pull signal shifts by 0.25 TP at the transition from track T3 to track T4. The push-pull signal PP2, which is the tracking signal when the center beam CB is moving along the track T4, or more generally the push-pull signal of the group of tracks after the transition, is shown in the upper part of FIG. 8. Shortly before the center beam CB reaches the end of track T3, the push-pull signal of the satellite beam SB1 already moves the pickup into the direction of the next track T4.

At the transition from track T3 to T4, the tracking signal shifts to the right by 0.25 TP, for example 120 nm, and the push-pull signal PP2 is the inverse of the signal PP1. The satellite beam SB1 is pushed to the right until it reaches the zero crossing point with negative slope at 120 nm track offset of the push-pull signal PP2. The satellite beam SB2 and the center beam CB move also to the right, as indicated by the arrows a4, a5 in FIG. 8. After the center beam CB has reached track T4, the satellite beam SB1 is located on the track T5 and satellite beam SB2 on a land section and the push-pull signals of each of the satellite beams SB1 and SB2 will be zero. Thus, the center beam CB will be regulated to follow track T4.

The end of track T3 may be indicated to the tracking regulation of the apparatus in advance, for example by a special information pattern of pits at the end of track T3, to indicate that a transition to the next group is required. Thus, the servo system can be triggered to invert the push-pull signal at the correct point of time. Also, the first pits of track T4 cannot be used because the tracking regulation requires some time for adjusting the pickup to follow the new track.

The transition from track T3 to T4 can be improved, if the track T3 is slightly bent into the direction of the track T4 before the transition and when the track T4 is slightly bent into the direction of track T3 at the beginning of track T4. This will force the pickup to move already into the direction of track T4 shortly before the track jump, and the pickup will adjust faster to the new location for reading data of the track T4. Alternatively, or additionally, a small voltage pulse of correct sign may be applied to the tracking actuator coil at the end of track T3, shortly before the track transition, to shift the pickup into the direction of track T4.

The pickup as described can be used also to track on a conventional Blu-Ray disc by using a conventional differential push-pull method. If the track pitch of the second embodiment of the table of FIG. 4 is used, the satellite beams SB1 and SB2 each have a radial distance, respectively or track offset, of 160 nm to the center beam CB equal to the track pitch TP. Then the satellite beams have the correct position to track also on a Blu-Ray disc track structure by using differential push-pull tracking. The optical disc of the invention may be composed therefore of two zones with different data density, a first, lower data density zone not requiring a super-resolution effect, corresponding for example with the Blu-Ray disc format, and a second, higher data density zone, for which super-resolution detection is required for reading of the data, and for which a reduced track pitch is used as described above.

Figure 1:
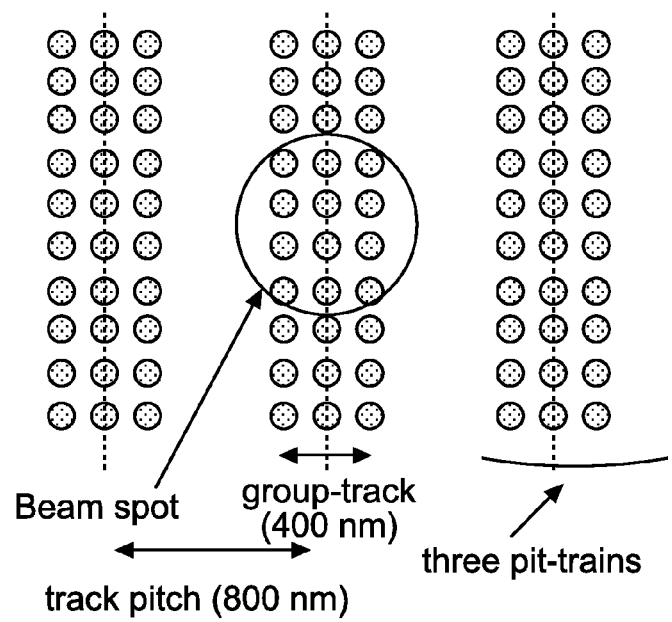
FIG. 1 a track structure of a prior art optical disc comprising tracks being arranged as groups, FIG. 2 an optical storage medium according to the invention with a layer stack comprising a substrate, a data layer and a super-resolution layer in a sectional view, FIG. 3 a track structure of the optical storage medium of FIG. 2, FIG. 4 a table showing optimized dimensions for the track structure of FIG. 3, FIGS. 5a, 5b, 5c tracking of a pickup on three different tracks of the track structure of FIG. 3, FIG. 6 illustration of a track transition from an outer track of a first group to an inner track of a second group, FIG. 7 an optical detector arrangement of a pickup, and FIG. 8 push-pull signals of a pickup before and after a transition from one group to the next group.

By using a track pitch between neighboring tracks within a group, which is below the diffraction limit of a pickup for reading of data of the optical disc, a high data capacity can be provided by the system. The track structure as shown in FIG. 3 can be applied advantageously to a Super-RENS optical disc, comprising a mask layer having a super resolution near-field structure, as described with regard to FIG. 1, but may be used also for present DVDs or Blu-Ray discs. The track pitch is in particular selected below 280 nm when using a Blu-Ray type pickup having a semiconductor laser emitting light with a wavelength of about 405 nm.

The invention may be applicable not only to read-only optical storage media, but also for writable and re-writable optical storage media. The foregoing embodiments and accompanying drawings are therefore merely illustrative, but not limitative, and also other embodiments of the invention may be utilized by a person skilled in the art without departing from the spirit and scope of the present invention. The invention resides therefore in the claims herein after appended.

The invention claimed is:

1. System comprising an optical disc and an apparatus including a pickup with a laser, a detector unit and an objective lens for reading data from the optical disc,
    the optical disc comprising a substrate layer and a data layer disposed on the substrate layer, the data layer having a mark/space data structure arranged in tracks being arranged in groups, which are separated each by a land section, and a group comprising an inner track, a center track and an outer track, the land section corresponding in width with a single empty track, wherein
    the tracks of the groups are arranged each as a spiral, the start of a track of a consecutive group beginning at a position corresponding with the end of a track of a preceding group, and the end of an outer track of a group corresponding with an angular and radial position of the beginning of an inner track of a subsequent group,
    the pickup provides a center beam for reading of data and for providing a second tracking signal and generates two satellite beams for providing a first and a third tracking signal, the three beams being arranged to be focused by the objective lens onto the optical storage medium and reflected light from the optical disc to be collected by the focus lens for guiding the collected light onto the detector unit,
    the two satellite beams have each a track offset of one track pitch with regard to the center beam, and
    the detector unit comprises a center detector for detecting reflected light from the center beam for reading of data and to generate the second tracking signal for tracking the pickup on the center track of the group and two satellite detectors for detecting reflected light from the satellite beams to generate the first tracking signal for tracking the pickup on the inner track of the group and to generate the third tracking signal for tracking the pickup on the outer track of the group.

2. The system of claim 1, wherein the two satellite detectors are each divided into at least two parts for providing a push-pull tracking error signal.

3. The system of claim 1, wherein the center detector is divided into four parts A-D providing electrical signals a, b, c, d, the first satellite detector is divided into two parts E1, E2 providing electrical signals e1, e2 and the second satellite detector is divided into two parts F1, F2 providing electrical signals f1, f2, and wherein the first tracking signal TE1 is calculated by taking into account the formula TE1=(e2−e1)−(f2−f1), when the center beam moves along an inner track of a group, the second tracking signal TE2 is calculated by taking into account the formula TE2=(a +b)−(c +d), when the center beam moves along a center track of a group, and the third tracking signal TE3 is calculated by taking into account the formula TE3=(f2−f1)−(e2−e1), when the center beam moves along an outer track of a group.

4. The system of claim 1, wherein the length of the empty track corresponds with an angular circumference of 360° of the optical disc.

5. The system of claim 1, wherein the end of an outer track of a group is bent into the direction of the beginning of an inner track of a subsequent group and the beginning of an inner track of a group is bent into the direction of the end of an outer track of a preceding group.

6. The system of claim 1, wherein each group comprises three tracks and the group to group track pitch between two neighboring groups is four times the track pitch between neighboring tracks within a group.

7. The system of claim 1, wherein the track pitch between neighboring tracks within a group is below the diffraction limit of a pickup for reading of data of the optical disc, and the group to group track pitch between two neighboring groups is above the diffraction limit of the pickup.

8. The system of claim 1, wherein the optical disc comprises a nonlinear layer with a super-resolution structure.

9. The system of claim 1, wherein the track pitch between neighboring tracks within a group is within a range of 120 nm-240 nm and the group to group track pitch between two neighboring groups is within a range of 480 nm-960 nm.

10. The system of claim 1, wherein the optical disc is a read-only storage medium and the mark/space data structure is provided as a pit/land structure.

11. An apparatus for a system according to claim 1.

12. An optical disc for a system according to claim 1.

\* \* \* \* \*